US012513346B2

(12) United States Patent
Chang et al.

(10) Patent No.: US 12,513,346 B2
(45) Date of Patent: *Dec. 30, 2025

(54) METHOD, SYSTEM, AND COMPUTER-READABLE RECORDING MEDIUM FOR IMPLEMENTING FAST-SWITCHING MODE BETWEEN CHANNELS IN MULTI-LIVE TRANSMISSION ENVIRONMENT

(71) Applicant: NAVER CORPORATION, Seongnam-si (KR)

(72) Inventors: Joon-kee Chang, Seongnam-si (KR); Sung Ho Kim, Seongnam-si (KR); Hyesung No, Seongnam-si (KR); Yun Ho Jung, Seongnam-si (KR); Jinhoon Kim, Seongnam-si (KR); Yeong Jin Jeong, Seongnam-si (KR); Jeongki Kim, Seongnam-si (KR); In Cheol Kang, Seongnam-si (KR); Jonghyeok Lee, Seongnam-si (KR); Jae Chul Ahn, Seongnam-si (KR); Sung Taek Cho, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/181,233

(22) Filed: Mar. 9, 2023

(65) Prior Publication Data
US 2023/0217047 A1    Jul. 6, 2023

Related U.S. Application Data

(63) Continuation of application No. PCT/KR2021/012025, filed on Sep. 6, 2021.

(30) Foreign Application Priority Data

Sep. 10, 2020   (KR) .................. 10-2020-0115872

(51) Int. Cl.
*H04N 21/2187*   (2011.01)
*H04N 21/218*    (2011.01)
(Continued)

(52) U.S. Cl.
CPC ... *H04N 21/2187* (2013.01); *H04N 21/21805* (2013.01); *H04N 21/2662* (2013.01); *H04N 21/4318* (2013.01); *H04N 21/4858* (2013.01)

(58) Field of Classification Search
CPC ......... H04N 21/2187; H04N 21/21805; H04N 21/2662; H04N 21/4318; H04N 21/23424;
(Continued)

(56) References Cited

U.S. PATENT DOCUMENTS 7,644,425 B2    1/2010  Parker et al.
10,516,911 B1 * 12/2019 Nielsen ............. H04N 21/4223
(Continued)

FOREIGN PATENT DOCUMENTS

JP       08279995 A    10/1996
JP       2004177614 A   6/2004
(Continued)

OTHER PUBLICATIONS

Japanese Office Action issued in corresponding to Japanese patent application No. 2023-513587, dated Mar. 5, 2024.
(Continued)

*Primary Examiner* — Gigi L Dubasky
(74) *Attorney, Agent, or Firm* — GREER BURNS & CRAIN, LTD.

(57) ABSTRACT

A method, a system, and a computer-readable recording medium implement a fast-switching mode between channels
(Continued)

in a multi-live transmission environment. A composite image in which images of multiple channels are synthesized into one image in a live transmission environment is received as one stream to configure a multi-view composed of the images of the multi-channels and, as an image of a specific channel is selected in the multi-view, the original image of the specific channel is received and the multi-view may be switched to a full-view of the image of the specific channel.

15 Claims, 13 Drawing Sheets

(51) Int. Cl.
*H04N 21/2662* (2011.01)
*H04N 21/431* (2011.01)
*H04N 21/485* (2011.01)

(58) Field of Classification Search
CPC ........... H04N 21/4307; H04N 21/4316; H04N 21/44016
See application file for complete search history.

(56) References Cited

U.S. PATENT DOCUMENTS

| | | | |
|---|---|---|---|
| 10,945,024 B2 | 3/2021 | Levy et al. | |
| 2002/0049979 A1* | 4/2002 | White | H04N 23/661 |
| | | | 348/E7.071 |
| 2007/0039032 A1 | 2/2007 | Goldey et al. | |
| 2007/0277214 A1 | 11/2007 | Kim et al. | |
| 2010/0138862 A1 | 6/2010 | Qin | |
| 2011/0113447 A1 | 5/2011 | Jung | |
| 2011/0119711 A1 | 5/2011 | Marshall et al. | |
| 2013/0027502 A1 | 1/2013 | Skramstad | |
| 2014/0118467 A1 | 5/2014 | Kim et al. | |
| 2014/0380380 A1* | 12/2014 | Heller | H04N 21/4725 |
| | | | 725/58 |
| 2016/0198214 A1* | 7/2016 | Levy | H04N 21/64322 |
| | | | 725/43 |
| 2017/0134762 A1 | 5/2017 | Goldberg et al. | |
| 2018/0199002 A1* | 7/2018 | Tung | H04N 21/4622 |
| 2020/0169766 A1* | 5/2020 | Chirokov | H04N 21/816 |
| 2020/0351525 A1* | 11/2020 | Sugimoto | G06T 19/00 |
| 2022/0116677 A1 | 4/2022 | Chang et al. | |
| 2023/0179815 A1* | 6/2023 | Choi | H04N 21/4316 |
| | | | 725/109 |

FOREIGN PATENT DOCUMENTS

| | | |
|---|---|---|
| JP | 2005522922 A | 7/2005 |
| JP | 2007329847 A | 12/2007 |
| KR | 1020060120571 A | 11/2006 |
| KR | 1020070025335 A | 3/2007 |
| KR | 100827198 B1 | 4/2008 |
| KR | 1020140055252 A | 5/2014 |
| KR | 1020150008739 A | 1/2015 |
| KR | 1020160078027 A | 7/2016 |
| KR | 1020170084554 A | 7/2017 |
| KR | 1020180005234 A | 1/2018 |
| WO | 03087961 A1 | 10/2003 |

OTHER PUBLICATIONS

Search Report issued in EP Patent Application No. 21820447.7, dated May 8, 2023.
Office Action issued in Japanese patent application No. 2021-571022, dated Jan. 24, 2023.
ISR issued in patent application No. PCT/KR2021/011317, dated Dec. 16, 2021.

* cited by examiner

501

502

330

<Channel#2 original video frame>  <Channel#2 original video full-view rendering>

METHOD, SYSTEM, AND COMPUTER-READABLE RECORDING MEDIUM FOR IMPLEMENTING FAST-SWITCHING MODE BETWEEN CHANNELS IN MULTI-LIVE TRANSMISSION ENVIRONMENT

CROSS-REFERENCE TO RELATED APPLICATIONS

This is a continuation application of International Application No. PCT/KR2021/012025, filed Sep. 6, 2021, which claims the benefit of Korean Patent Application No. 10-2020-0115872, filed Sep. 10, 2020.

BACKGROUND OF THE INVENTION

Field of Invention

One or more example embodiments of the following description of the present invention relate to technology for switching between channels in a multi-live transmission environment.

Description of Related Art

A sudden increase in the number of high-speed communication network users enables the development of new services and diversification of service items through a communication network. Among services using the communication network, the most common service may be a video service.

For example, technology for providing a video link service capable of viewing a linked video on the Internet using a mobile communication terminal while on the move is disclosed in Korean Patent Registration No. 10-0827198 (registered on Apr. 25, 2008) titled "Apparatus and Method for Providing a Video Link Service."

A client-server video service system is in a structure that delivers real-time video streaming from an encoder server to a client. A method of encoding a video input from a camera and delivering the encoded video with audio data to a client in real time is used in a live transmission environment.

When video streaming data for live transmission is received through multiple channels, there are many difficulties and limitations in providing a live video service to a plurality of clients through a method of encoding and transmitting a plurality of videos received through multiple channels in real time.

BRIEF SUMMARY OF THE INVENTION

One or more example embodiments of the present invention provide a method and a system that may configure a multi-view including a multi-channel video using minimum network resources in a multi-live transmission environment providing a multi-channel live video.

One or more example embodiments provide a method and a system that may configure a fast-switching mode while maintaining synchronization of audio and video when switching between channels in a multi-live transmission environment.

According to an aspect of at least one example embodiment of the invention, there is provided a live video playback method executed by a computer device including at least one processor configured to execute computer-readable instructions included in a memory, the live video playback method including receiving, by the at least one processor, a composite video in which videos of multiple channels are synthesized into a single video in a live transmission environment and configuring a multi-view that includes the videos of the multiple channels; and receiving, by the at least one processor, an original video of a specific channel in response to a selection on a video of the specific channel in the multi-view and switching from the multi-view to a full-view for the video of the specific channel.

According to an aspect of the invention, the configuring of the multi-view may include acquiring a channel-wise sprite by separating a composition image for each channel from the composite video; and configuring the multi-view by rendering the channel-wise sprite according to a layout.

According to another aspect, the composite video may be configured as a main video having a resolution higher than that of a video of a remaining other channel and the video of the other channel may be configured as a sub-video.

According to still another aspect, the switching to the full-view may include rendering a sprite of the specific channel among channel-wise sprites separated from the composite video to a full screen in response to the selection on the video of the specific channel in the multi-view and then receiving the original video and rendering the original video to the full screen.

According to still another aspect, in the full-view in which the sprite of the specific channel is rendered to the full screen, a sprite of the remaining other channel may be included in a hidden state without being rendered.

According to still another aspect, the live video playback method may further include receiving, by the at least one processor, the composite video and switching from the full-view to the multi-view in response to receiving a switching request from the full-view to the multi-view.

According to still another aspect, the switching to the multi-view may include rendering a temporary screen to a predefined layout in response to the switching request and then receiving the composite video and rendering channel-wise sprites separated from the composite video to a layout of the multi-view.

According to still another aspect, the switching to the multi-view may include configuring the temporary screen using one of a thumbnail included in a video stream, a copy of the original video, and a last video displayed in the multi-view before switching to the full-view.

According to still another aspect, in the case of the temporary screen using the copy, the copy may be displayed through blur-processing.

According to still another aspect, a segment duration of a video stream may be changed for video switching between the multi-view and the full-view.

According to still another aspect, a video stream corresponding to previous data may be flushed from a player buffer for video switching between the multi-view and the full-view.

According to still another aspect, a video switching point in time between the multi-view and the full-view may be determined using timed-metadata included in a container of a video stream.

According to an aspect of at least one example embodiment, there is provided a computer-readable recording medium storing a program to computer-implement the live video playback method.

According to an aspect of at least one example embodiment, there is provided a computer device including at least one processor configured to execute computer-readable instructions included in a memory. The at least one processor is configured to receive a composite video in which videos of multiple channels are synthesized into a single video in a live transmission environment and configure a multi-view that includes the videos of the multiple channels, and to receive an original video of a specific channel in response to a selection on a video of the specific channel in the multi-view and switch from the multi-view to a full-view for the video of the specific channel.

According to some example embodiments, it is possible to play back a multi-channel live video using minimum network resources by receiving a single stream in which live videos of multiple channels are synthesized and thereby configuring a multi-view in a multi-live transmission environment.

According to some example embodiments, it is possible to enhance quality of service (QoS) and quality of experience (QoE) by implementing a fast-switching mode while maintaining synchronization of audio and video when switching between channels in a multi-live transmission environment.

DETAILED DESCRIPTION OF THE INVENTION

Hereinafter, some example embodiments will be described with reference to the accompanying drawings.

A live video playback system according to the example embodiments may be implemented by at least one computer device and a live video playback method according to the example embodiments may be performed by at least one computer device included in the live video playback system. Here, a computer program according to an example embodiment may be installed and executed on the computer device, and the computer device may perform the live video playback method according to the example embodiments under the control of the executed computer program. The aforementioned computer program may be stored in a computer-readable storage medium to computer-implement the live video playback method in conjunction with the computer device.

Figure 1:
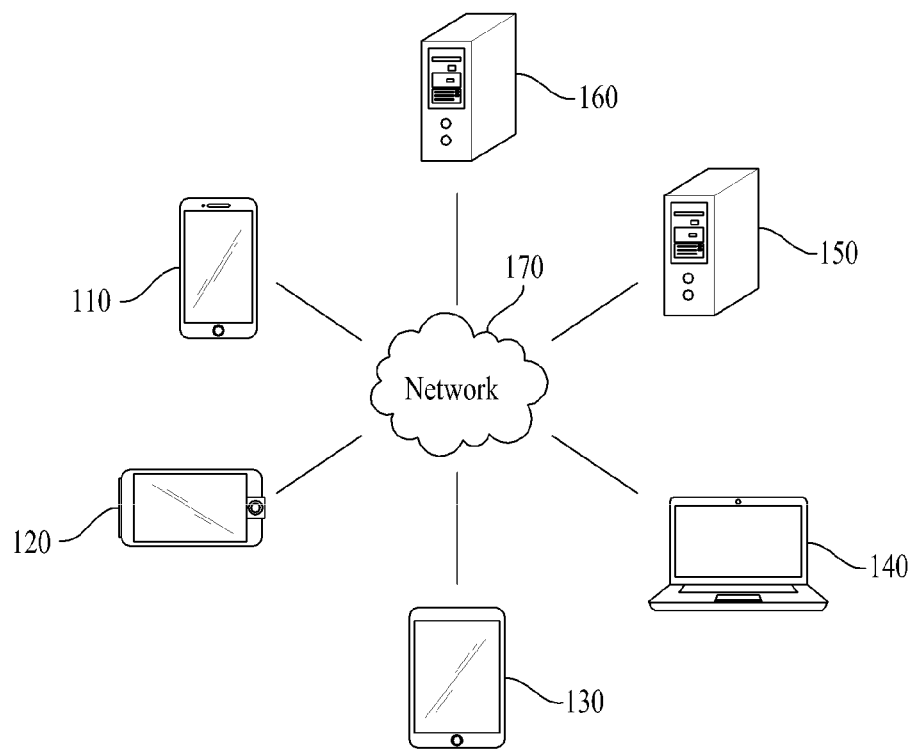
FIG. 1 is a diagram illustrating an example of a network environment according to an example embodiment.

FIG. 1 illustrates an example of a network environment according to an example embodiment. Referring to FIG. 1, the network environment may include a plurality of electronic devices 110, 120, 130, and 140, a plurality of servers 150 and 160, and a network 170. FIG. 1 is provided as an example only. The number of electronic devices or the number of servers is not limited thereto. Also, the network environment of FIG. 1 is provided as an example only among environments applicable to the example embodiments and the environment applicable to the example embodiments is not limited to the network environment of FIG. 1.

Each of the plurality of electronic devices 110, 120, 130, and 140 may be a fixed terminal or a mobile terminal that is configured as a computer device. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet personal computer (PC), and the like. For example, although FIG. 1 illustrates a shape of a smartphone as an example of the electronic device 110, the electronic device 110 used herein may refer to one of various types of physical computer devices capable of communicating with other electronic devices 120, 130, and 140 and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, and a broadcasting network) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer device or a plurality of computer devices that provides an instruction, a code, a file, content, a service, etc., through communication with the plurality of electronic devices 110, 120, 130, and 140 over the network 170. For example, the server 150 may be a system that provides a service (e.g., a live video service, a content providing service, a group call service (or an audio conference service), a messaging service, a mail service, a social network service, a map service, a translation service, a financial service, a payment service, a search service, etc.) to the plurality of electronic devices 110, 120, 130, and 140 connected over the network 170.

Figure 2:
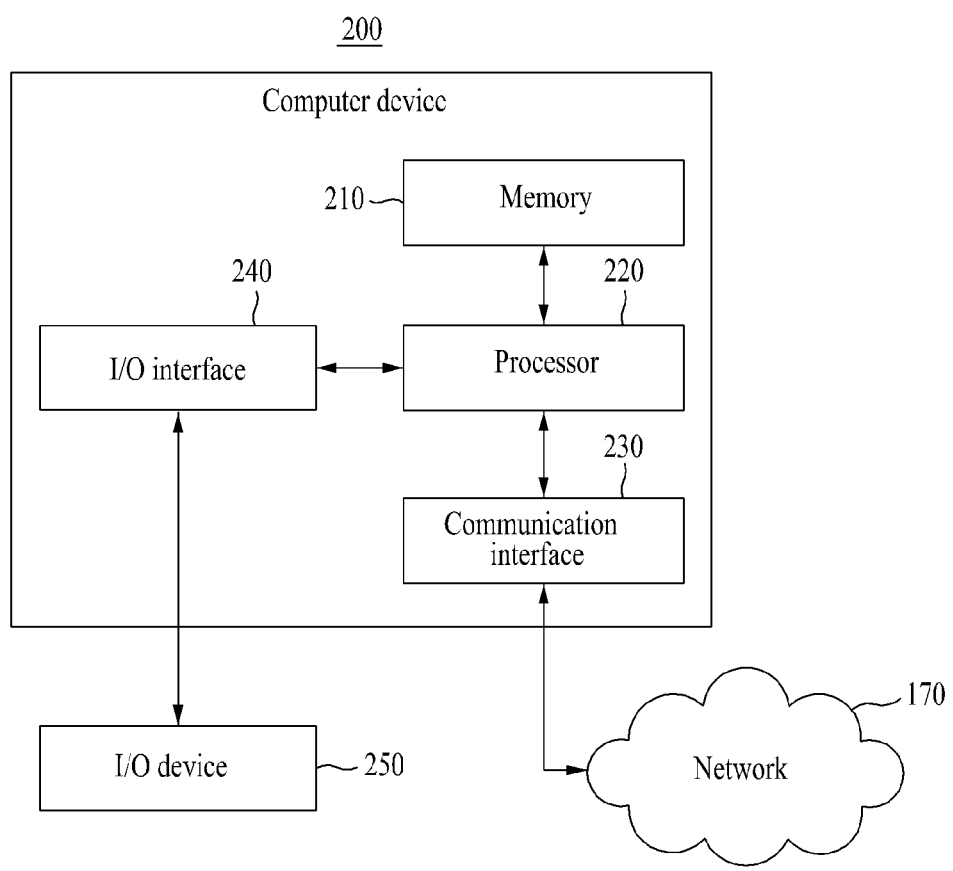
FIG. 2 is a diagram illustrating an example of a computer device according to an example embodiment.

FIG. 2 is a block diagram illustrating an example of a computer device according to an example embodiment. Each of the plurality of electronic devices 110, 120, 130, and 140 of FIG. 1 or each of the servers 150 and 160 may be implemented by a computer device 200 of FIG. 2.

Referring to FIG. 2, the computer device 200 may include a memory 210, a processor 220, a communication interface 230, and an input/output (I/O) interface 240. The memory 210 may include a permanent mass storage device, such as a random access memory (RAM), a read only memory (ROM), and a disk drive, as a computer-readable recording medium. The permanent mass storage device, such as ROM and a disk drive, may be included in the computer device 200 as a permanent storage device separate from the memory 210. Also, an OS and at least one program code may be stored in the memory 210. Such software components may be loaded to the memory 210 from another computer-readable recording medium separate from the memory 210. The other computer-readable recording medium may include a computer-readable recording medium, for example, a floppy drive, a disk, a tape, a DVD/CD-ROM drive, a memory card, etc. According to other example embodiments, software components may be loaded to the memory 210 through the communication interface 230, instead of the computer-readable recording medium. For example, the software components may be loaded to the memory 210 of the computer device 200 based on a computer program installed by files received over the network 170.

The processor 220 may be configured to process instructions of a computer program by performing basic arithmetic operations, logic operations, and I/O operations. The computer-readable instructions may be provided from the memory 210 or the communication interface 230 to the processor 220. For example, the processor 220 may be configured to execute received instructions in response to the program code stored in the storage device, such as the memory 210.

The communication interface 230 may provide a function for communication between the communication apparatus 200 and another apparatus (e.g., the aforementioned storage devices) over the network 170. For example, the processor 220 of the computer device 200 may deliver a request or an instruction created based on a program code stored in the storage device such as the memory 210, data, and a file, to other apparatuses over the network 170 under control of the communication interface 230. Inversely, a signal, an instruction, data, a file, etc., from another apparatus may be received at the computer device 200 through the network 170 and the communication interface 230 of the computer device 200. For example, a signal, an instruction, data, etc., received through the communication interface 230 may be delivered to the processor 220 or the memory 210, and a file, etc., may be stored in a storage medium (e.g., the permanent storage device) further includable in the computer device 200.

The I/O interface 240 may be a device used for interfacing with an I/O device 250. For example, an input device of the I/O device 250 may include a device, such as a microphone, a keyboard, a mouse, etc., and an output device of the I/O device 250 may include a device, such as a display, a speaker, etc. As another example, the I/O interface 240 may be a device for interfacing with an apparatus in which an input function and an output function are integrated into a single function, such as a touchscreen. The I/O device 250 may be configured as a single apparatus with the computer device 200.

Also, according to other example embodiments, the computer device 200 may include greater or less number of components than those shown in FIG. 2. For example, the computer device 200 may include at least a portion of the I/O device 250, or may further include other components, for example, a transceiver, a database, etc.

Figure 3:
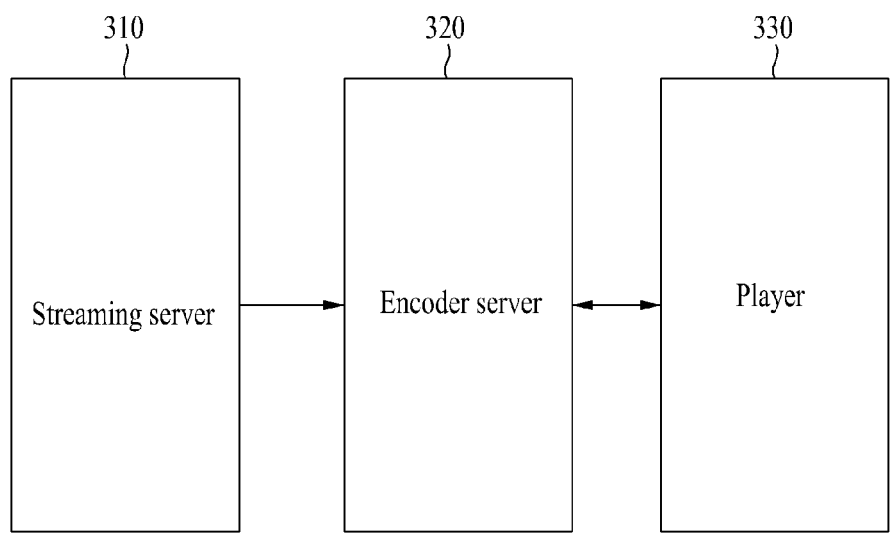
FIG. 3 illustrates an example of a process of providing a live video service according to an example embodiment.

FIG. 3 illustrates an example of a process of providing a live video service according to an example embodiment. FIG. 3 illustrates a streaming server 310, an encoder server 320, and a player 330. Here, the streaming server 310 and the encoder server 320 may be software modules installed and running on a server device to provide the live video service. Also, the player 330 may be a software module installed and running on a terminal device of a user for video playback. Here, the software module may correspond to a computer program installed and running on the computer device 200.

Figure 4:
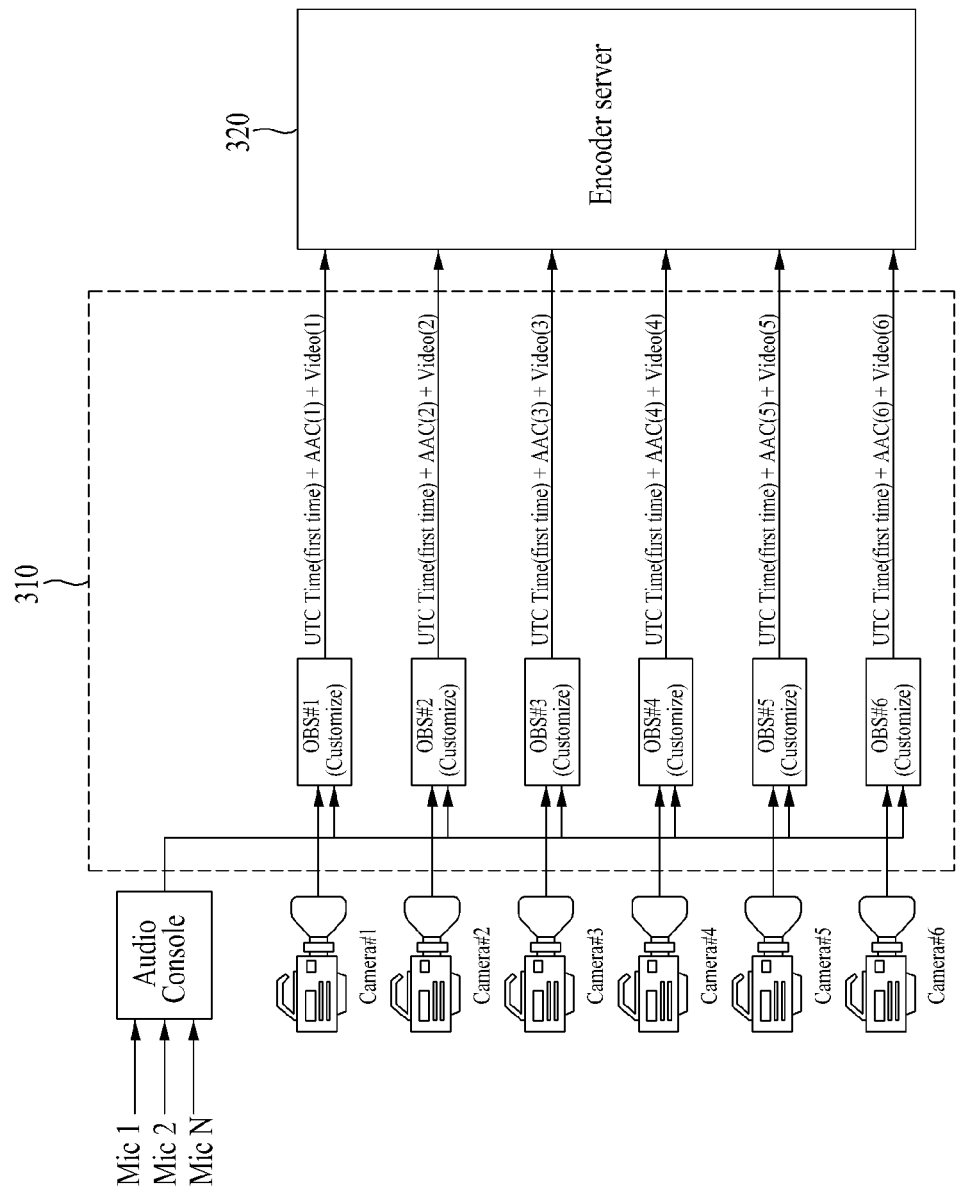
FIG. 4 illustrates an example of a multi-live transmission environment according to an example embodiment.

Referring to FIG. 4, the streaming server 310 refers to a server device that serves as a transmission device and may include, for example, an open broadcaster software (OBS) module for recording and real-time streaming. The streaming server 310 may receive videos simultaneously captured by a plurality of cameras through the respective channels and may real-time stream the videos to the encoder server 320 as a multi-channel video.

Regardless of a camera, an audio channel may use the same input. The encoder server 320 may use audio of a basic channel among the plurality of channels as a basic stream.

The streaming server 310 may transmit the multi-channel video using the OBS module for synchronization processing between video channels. Therefore, the encoder server 320 may process synchronization between video channels by acquiring an absolute time of each video frame using a coordinated universal time (UTC) and a video timestamp, for example, a predetermined time standard (PTS).

In particular, the encoder server 320 may provide an image in which videos of multiple channels are synthesized into a single video such that the player 330 may configure a multi-view using minimum network resources in a multi-live transmission environment.

Figure 5:
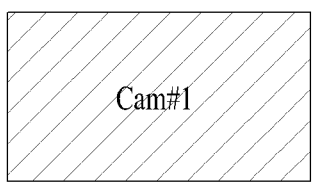
FIG. 5 illustrates an example of a process of encoding a multi-channel video according to an example embodiment.
Figure 5:
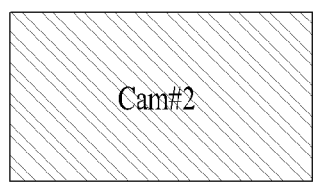
Figure 5:
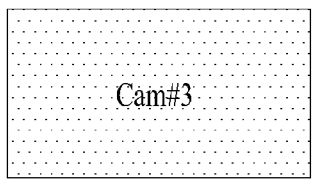
Figure 5:
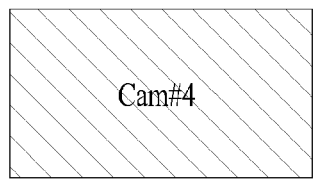
Figure 5:
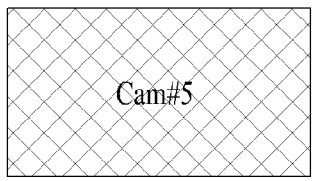
Figure 5:
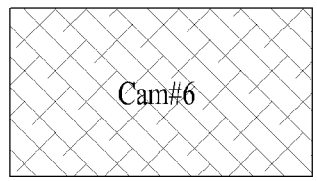
Figure 5:
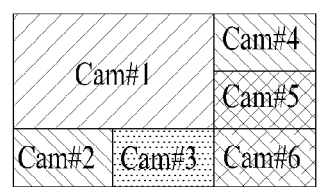

Referring to FIG. 5, the encoder server 320 may receive a plurality of original videos 501 input through multiple channels and may provide a composite video 502 generated by synthesizing the original videos 501.

For example, the encoder server 320 may generate the composite video 502 using the original videos (Cam #1, Cam #2, Cam #3, Cam #4, Cam #5, and Cam #6) 501 captured through six cameras. The composite video 502 refers to an image in which the original videos 501 are combined into a single video, and the encoder server 320 may generate the composite video 502 by combining the original videos 501 according to a predetermined layout.

For example, the encoder server 320 may configure a video of one channel among multiple channels as a main video and may configure videos of remaining other channels as sub-videos. That is, the encoder server 320 may configure a video (main video) of one channel using a resolution higher than those of videos (sub-videos) of other channels. Here, the encoder server 320 may configure all the videos (sub-videos) of the remaining channels, excluding one channel, using the same resolution or may configure the videos using a priority-based resolution in consideration of priority of the respective channels.

The encoder server 320 may also generate the composite video 502 by combining all the videos of channels with the same resolution.

In the aforementioned generation method of generating the composite video 502, the number of composite videos 502, and a layout structure are provided as an example only and may be modified.

That is, to implement a fast-switching mode, in which a rapid switch is achieved, between channels in the player 330 that is a client, the encoder server 320 prepares the original videos 501 for the respective channels and a single composite video 502 in which the original videos 501 are synthesized.

The encoder server 320 may selectively transmit, to the player 330, the composite video 502 of the multiple channels for the fast-switching mode between channels or only one original video 501 for a specific channel in a multi-live transmission environment. In particular, in the multi-live transmission environment, the encoder server 320 may transmit the videos of multiple channels as a single stream using the composite video 502 instead of transmitting the plurality of videos received through the multiple channels as the respective streams.

In the following example embodiment, the original video 501 is referred to as "channel #1 original video," "channel #2 original video," etc., for each channel.

Unique information capable of identifying a corresponding video may be included in a stream of each of the original video 501 and the composite video 502. When a video being played back is changed to "channel #2 original video" during playback of the composite video, the player 330 may recognize that the changed video is "channel #2 original video."

Figure 6:
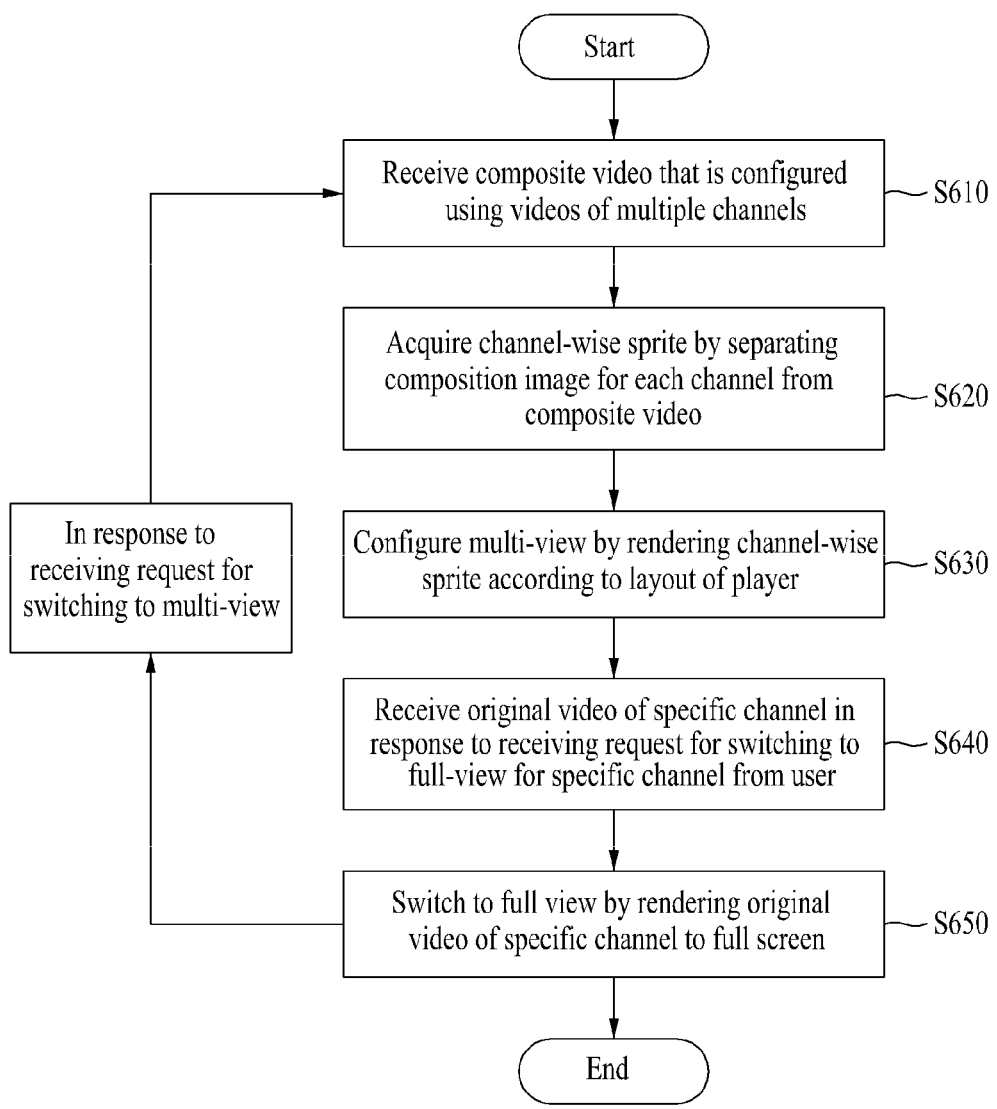
FIG. 6 is a flowchart illustrating an example of a live video playback method according to an example embodiment.

FIG. 6 is a flowchart illustrating an example of a live video playback method according to an example embodiment. The live video playback method according to the example embodiment may be performed by the computer device 200 that implements the player 330. If the player 330 is implemented on a terminal device of a user, the computer device 200 may correspond to the terminal device of the user. In this case, the processor 220 of the computer device 200 may be implemented to execute a control instruction according to a code of an OS included in the memory 210 or a code of at least one program. Here, the processor 220 may control the computer device 200 to perform operations S610 to S650 included in the method of FIG. 6 according to a control instruction provided from the code stored in the computer device 200.

In operation S610, the computer device 200 may receive a single composite video that is configured using a plurality of videos input through multiple channels from the encoder server 320 in a multi-live transmission environment. The computer device 200 may receive a video stream in which live videos of multiple channels are synthesized into a single video by downloading a single stream from the encoder server 320. When the encoder server 320 stores a plurality of composite videos in different layouts, the computer device 200 may selectively receive a composite video corresponding to layout information determined in the player 330 by referring to layout information of the composite video. For example, when the player 330 requests a layout in which a video of channel 1 is configured as a main video, the player 330 may receive a composite video corresponding to the requested layout from the encoder server 320.

In operation S620, the computer device 200 may acquire a channel-wise sprite (i.e., individual images subject to synthesis) by separating a composition image for each channel from the composite video received as a single stream. That is, the computer device 200 may acquire the channel-wise sprite by separating the composite video through postprocessing. The computer device 200 may separate the composite video using various graphics engines, for example, an open graphics library (GL), according to a platform.

In operation S630, the computer device 200 may configure a mode of view of the player 330 to a multi-view by rendering the channel-wise sprite according to the layout of the player 330. That is, the computer device 200 may play back live videos of multiple channels received as a single stream in the multi-view by rendering a sprite for each camera separated from the composite video to be suitable for a desired layout.

In operation S640, in response to selecting a specific channel in the multi-view and receiving a request for switching the mode of view of the player 330 from the multi-view to a full-view for the specific channel from the user, the computer device 200 may receive an original video of the corresponding specific channel from the encoder server 320. When the user selects the specific channel of a multi-channel live video being currently played back in the multi-view on the player 330 and requests switching to a full screen mode, that is, to the full-view, the computer device 200 may change the composite video received from the encoder server 320 to an original video of a channel to which the user desires to switch.

In operation S650, the computer device 200 may switch the view mode of the player 330 to the full-view by rendering the original video of the specific channel selected by the user to a full screen of the player 330.

In response to receiving a switching request to the multi-view from the user in a state in which the current view mode of the player 330 is the full-view, the computer device 200 may switch the view mode of the player 330 from the full-view to the multi-view by repeating the aforementioned process including operations S610 to S630.

In the live video playback method of FIG. 6, the different modes of view of the player 330, including multi-view and full-view, may be displayed through an output device of the I/O device 250 in the computer device 200 implementing the player 330.

Figure 7:
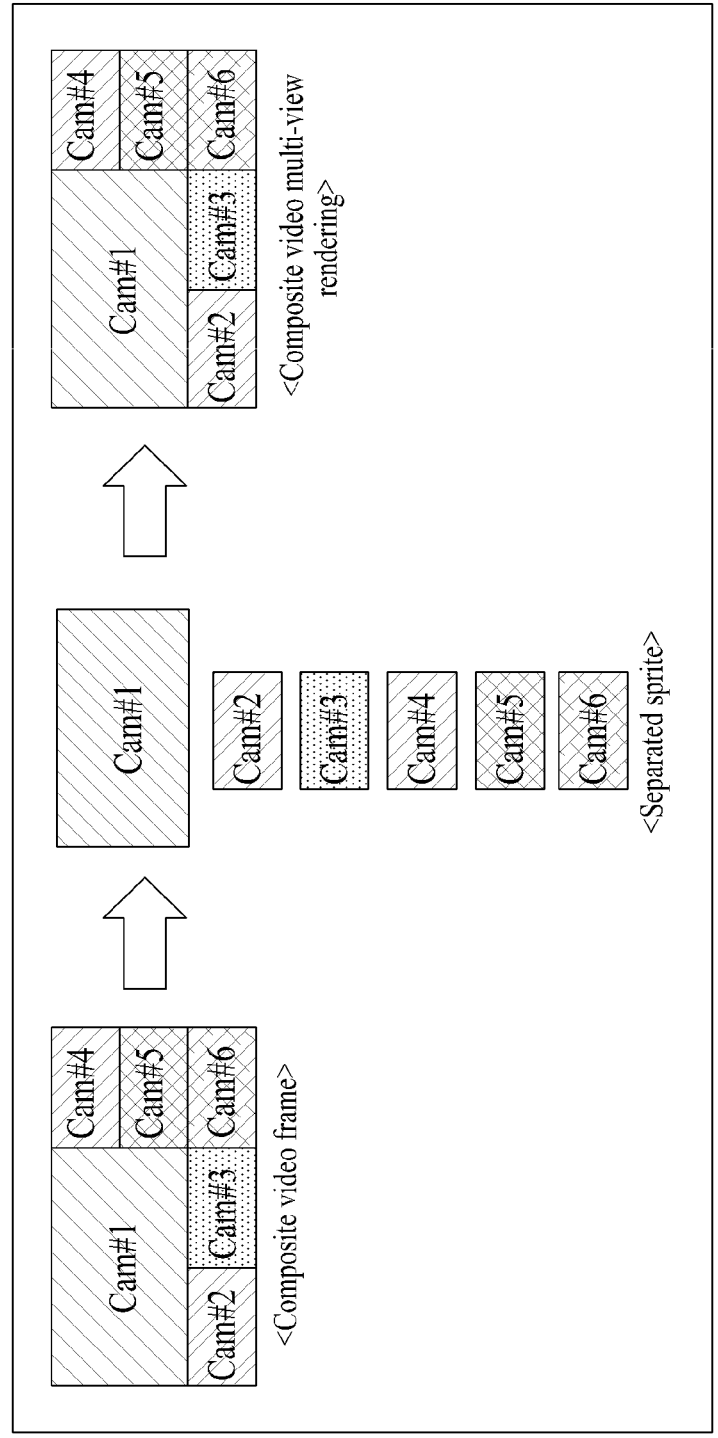
FIG. 7 illustrates an example of a basic process of configuring a multi-view with a single stream according to an example embodiment.

FIG. 7 illustrates an example of a basic process of configuring a multi-view with a single stream according to an example embodiment.

FIG. 7 illustrates a process of configuring, by the player 330, a multi-view using a composite video. For example, in the composite video, a video of channel 1 (Cam #1) is configured as a main video having a resolution higher than those of videos of other channels (Cam #2 to Cam #6).

Referring to FIG. 7, the player 330 may configure the multi-view by receiving a composite video frame from the encoder server 320, acquiring channel-wise sprites from the composite video frame through postprocessing, and then rendering the separated channel-wise sprites according to a preset layout.

Therefore, the player 330 may configure the multi-view that includes live videos of multiple channels by downloading only a single stream in a multi-live transmission environment.

Figure 8:
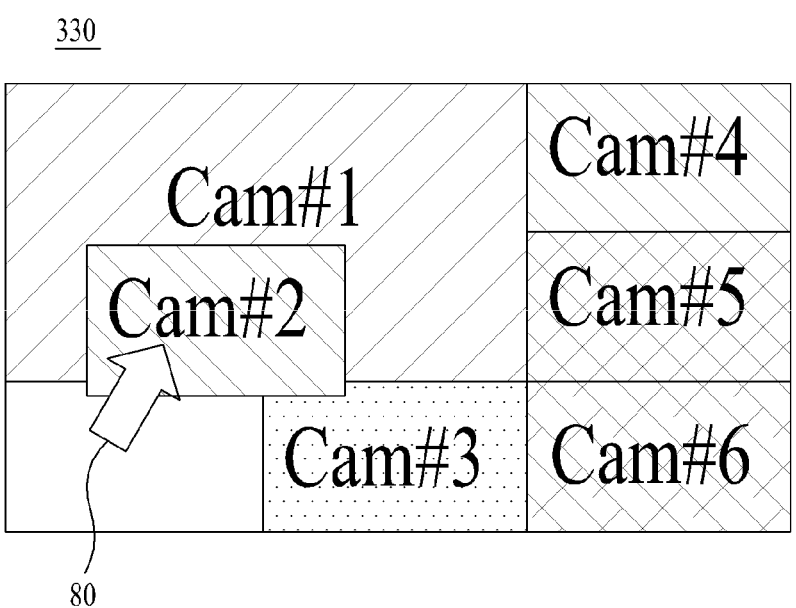
FIG. 8 illustrates an example of an interface for switching a view mode according to an example embodiment.

FIG. 8 illustrates an example of an interface for switching a view mode according to an example embodiment.

The player 330 provides an interface for requesting switching from a multi-view to a full-view for a video of a specific channel.

In a situation in which a multi-channel live video is being played back in a form of the multi-view on the player 330, a user may input a layout switching request for switching one of videos within the multi-view (Cam #1 to Cam #6) to a full-view.

For example, referring to FIG. 8, the player 330 may request switching to a full-view for a video of channel 2 (Cam #2) by moving the video of channel 2 (Cam #2) to a main video location at which a video of channel 1 (Cam #1) is currently being played back through a drag 80 on a multi-view screen using a composite video. The player 330 may also request switching to the full-view through a predetermined menu or another gesture by selecting the video of channel 2 (Cam #2) from among the videos within the multi-view (Cam #1 to Cam #6) in addition to the drag 80.

Figure 9:
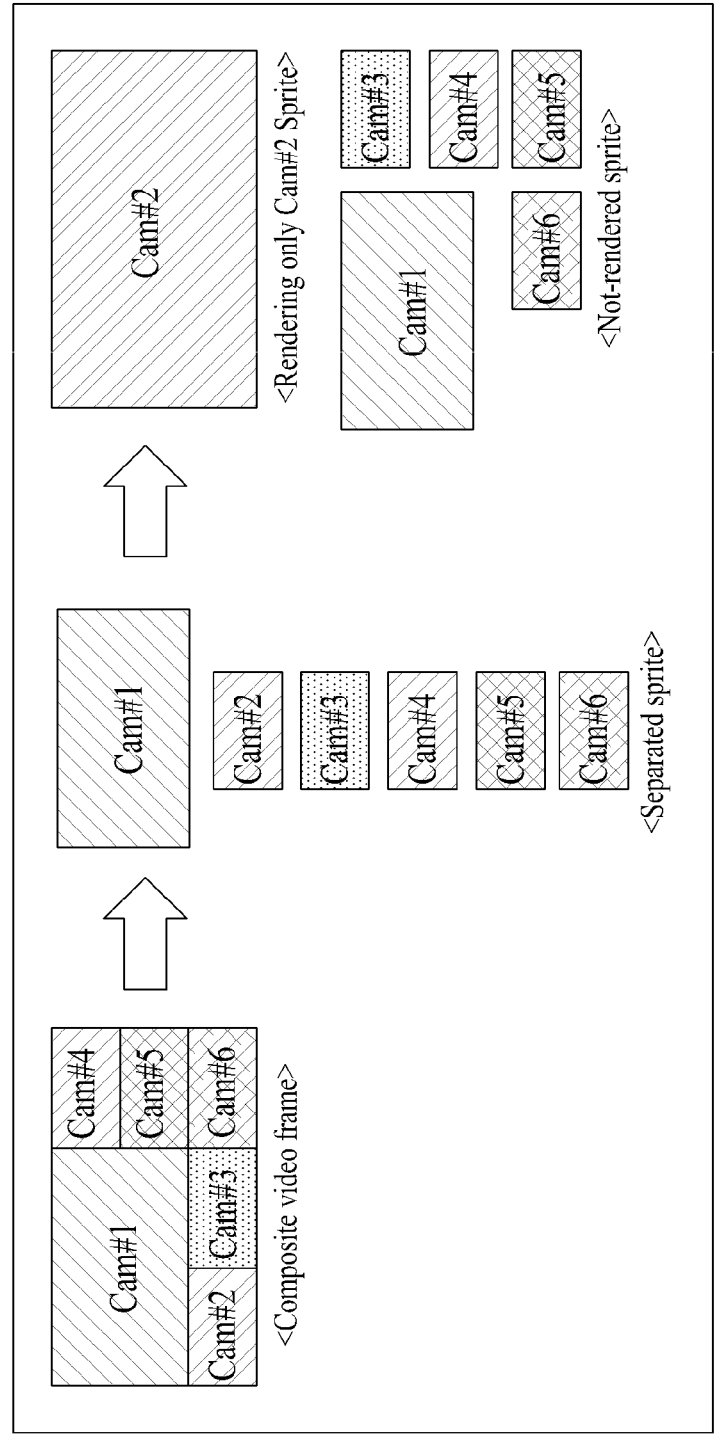
FIGS. 9 and 10 illustrate examples of a layout switching process from a multi-view to a full-view according to an example embodiment.
Figure 10:
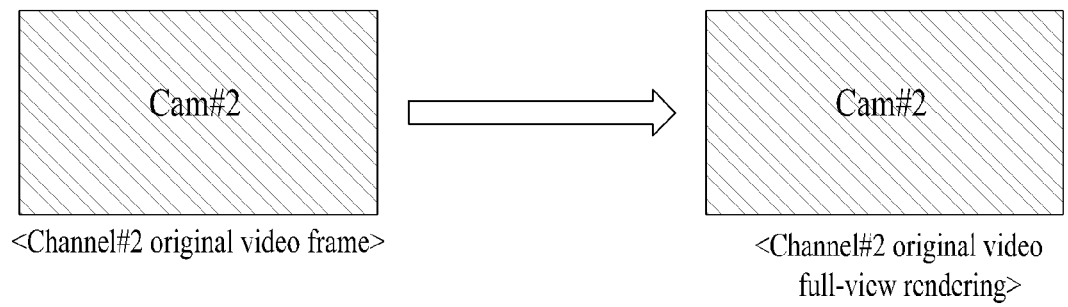

FIGS. 9 and 10 illustrate examples of a layout switching process from a multi-view to a full-view according to an example embodiment.

FIGS. 9 and 10 illustrate a process of switching from a multi-view using a composite video to a full-view of a video of channel 2 (Cam #2).

Referring to FIG. 9, in response to a request from the user to the full-view for the video of channel 2 (Cam #2) on a multi-view screen using the composite video, the player 330 may render only a sprite corresponding to the video of channel 2 (Cam #2) among channel-wise sprites separated from the composite video to a full screen. The video of channel 2 (Cam #2) separated from the composite video is a low-quality video and may be enlarged in a low-quality state and displayed in the full-view. Here, videos of remaining channels (Cam #1 and Cam #3 to Cam #6) separated from the composite video are maintained in a hidden state without being rendered.

Referring to FIG. 10, to provide a high-quality video for the video of channel 2 (Cam #2) displayed in the full-view, the player 330 may receive a channel #2 original video from the encoder server 320. The player 330 may provide a full-view of a high-quality video for the video of channel 2 (Cam #2) by receiving a channel #2 original video frame and by rendering the corresponding video to a full screen.

Therefore, when the user requests the video of channel 2 (Cam #2) to be switched to the full-view on a multi-view screen using the composite video, the player 330 may perform layout switching from the multi-view to the full-view by preferentially displaying the video of channel 2 (Cam #2) with a low resolution separated from the composite video in the full-view and then receiving the channel #2 original video and displaying the video of channel 2 (Cam #2) with a high resolution in the full-view to prevent occurrence of a blue screen.

Figure 11:
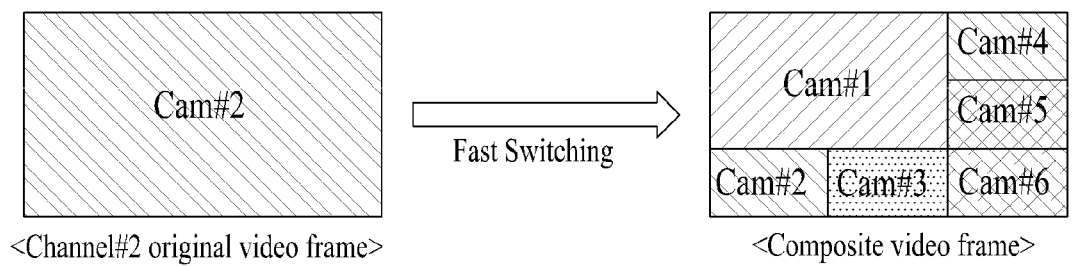
FIG. 11 illustrates an example of a layout switching process from a full-view to a multi-view according to an example embodiment.

FIG. 11 illustrates an example of a layout switching process from a full-view to a multi-view according to an example embodiment.

FIG. 11 illustrates a process of switching from a full-view of a video of channel 2 (Cam #2) to a multi-view using a composite video.

Referring to FIG. 11, in response to requesting switching to a multi-view of a basic layout, that is, the multi-view using the composite video on a full-view screen of the video of channel 2 (Cam #2) using a channel #2 original video, the player 330 may configure the multi-view by receiving a composite video frame from the encoder server 320, acquiring channel-wise sprites from the composite video frame through postprocessing, and then rendering the separated channel-wise sprites according to a preset layout.

The player 330 may perform fast layout switching from the full-view to the multi-view by switching a track to the basic layout on the full-view screen of the video of channel 2 (Cam #2) through a high-speed track switching technology for changing the channel #2 original video received from the encoder server 320 to the composite video as quickly as possible.

Since a channel #2 original video stream does not include information required to configure a multi-view layout, that is, videos of other channels (Cam #1 and Cam #3 to Cam #6), track switching technology for receiving a composite video stream within a short period of time is used. In a mode in which an audio and a video are interleaved, when the player 330 performs track switching in which a video (original video and composite video) is received from the encoder server 320, the audio may be seamlessly played back and only the video may be quickly switched.

In a video streaming environment for live transmission, a segment duration of a stream may be changed during a live video playback. In an environment in which an audio and a video are interleaved, a short media segment duration for streaming may be set and applied for fast video switching. As another example, technology for flushing the existing data within a buffer of the player 330 may be applied. For example, for faster switching when switching from the full-view using the channel #2 original video to the multi-view using the composite video, the player 330 may apply a method of emptying previous data (channel #2 original video stream) in a buffer at a point in time at which a view mode switching request is received and filling new data (composite video stream) in the buffer.

In an environment in which an audio and a video are not interleaved, track switching may be applied by quickly switching only a video track without switching an audio track. For fast switching when switching a video track, technology for flushing existing data in a buffer of the player 330 may be applied.

In an environment in which the player 330 may not be customized, it may be implemented by receiving a request of the player 330 in a multi-view interceptor and by re-requesting a segment (TS file) of a switched track. The multi-view interceptor may serve as a proxy server and may be software modules installed and running on a terminal device of the user for video playback with the player 330. When switching from the multi-view using the composite video to the full-view, the player 330 may continuously request the multi-view and, here, the multi-view interceptor may change the request of the player 330 to the full-view and then make a request. An audio of a TS file of each track may be encoded to the same audio to provide seamless user experience when switching.

Figure 12:
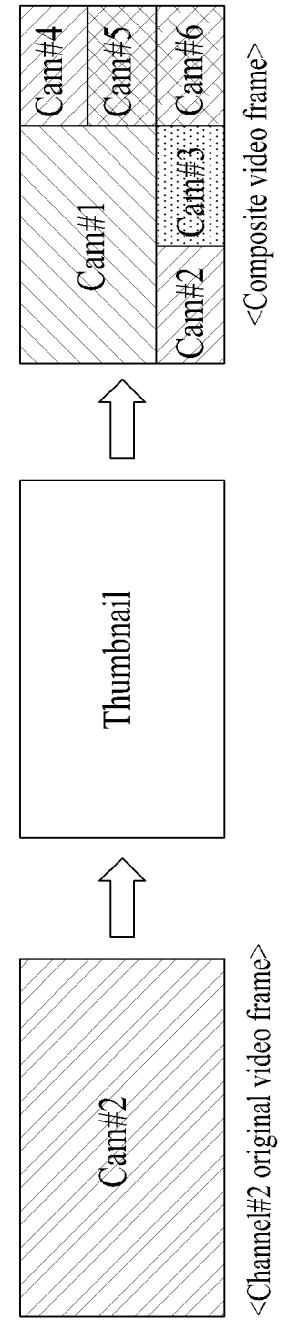
FIG. 12 illustrates another example of a layout switching process from a full-view to a multi-view according to an example embodiment.

FIG. 12 illustrates another example of a layout switching process from a full-view to a multi-view according to an example embodiment.

FIG. 12 illustrates a process of switching from a full-view of a video of channel 2 (Cam #2) to a multi-view using a composite video.

Since a channel #2 original video stream does not include information required to configure a multi-view layout, that is, videos of other channels (Cam #1 and Cam #3 to Cam #6), a temporary disconnection may occur when switching from the full-view to the multi-view. To avoid this, temporary screen switching technology using a thumbnail may be applied.

Referring to FIG. 12, in response to a request for switching to a multi-view of a basic layout, that is, a multi-view using a composite video on a full-view screen of the video of channel 2 (Cam #2) using a channel #2 original video, the player 330 may switch to a temporary view mode by rendering at least one thumbnail (e.g., image, animation, etc.) provided as metadata within a video stream according to a preset layout, for seamless screen switching. In the temporary view mode, the thumbnail may be output at desired time periods (e.g., every 1 second).

In addition to temporary screen switching technology using a thumbnail, other related information may be rendered to a temporary screen. For example, the temporary view mode may be provided by configuring the temporary screen in a multi-view form of a basic layout using a copy of the channel #2 original video. That is, a video of another channel other than channel #2 may be temporarily displayed as the copy of the channel #2 original video. Here, the video of the other channel (i.e., the copy of the channel #2 original video) temporarily displayed may be displayed through blur-processing. As another example, the temporary view mode may be provided by rendering a scene of a last video displayed in the multi-view before switching from the multi-view to the full-view to a temporary screen.

The player 330 may switch from the temporary view mode to the multi-view by receiving a composite video frame from the encoder server 320, by acquiring channel-wise sprites from the composite video frame through post-processing, and by rendering the separated channel-wise sprites to be suitable for a preset layout.

Therefore, when the user requests switching to the multi-view using the composite video on the full-view screen of the video of channel 2 (Cam #2) using the channel #2 original video, the player 330 may perform layout switching from the full-view to the multi-view through the temporary view mode by preferentially providing a temporary image to prevent occurrence of a blue screen and then receiving the composite video and rendering the channel-wise sprites separated from the composite video to be suitable for the corresponding layout.

In general, when a stream of the same resolution is repeatedly output, a type of the corresponding stream may not be identified. In a multi-view environment, a configuration type of a stream currently output needs to be known and a video of each channel may be separated in a corresponding layout based on the corresponding information.

The player 330 may determine a video switching point in time between view modes based on meta information for video classification as unique information included in a video stream. The meta information for video classification may be diversified depending on a system environment. For example, in an environment using a TS chunk, the video switching point in time may be determined using timed-metadata included in a TS container. The timed metadata includes time information of a PTS and metadata is output when a corresponding time is reached.

Figure 13:
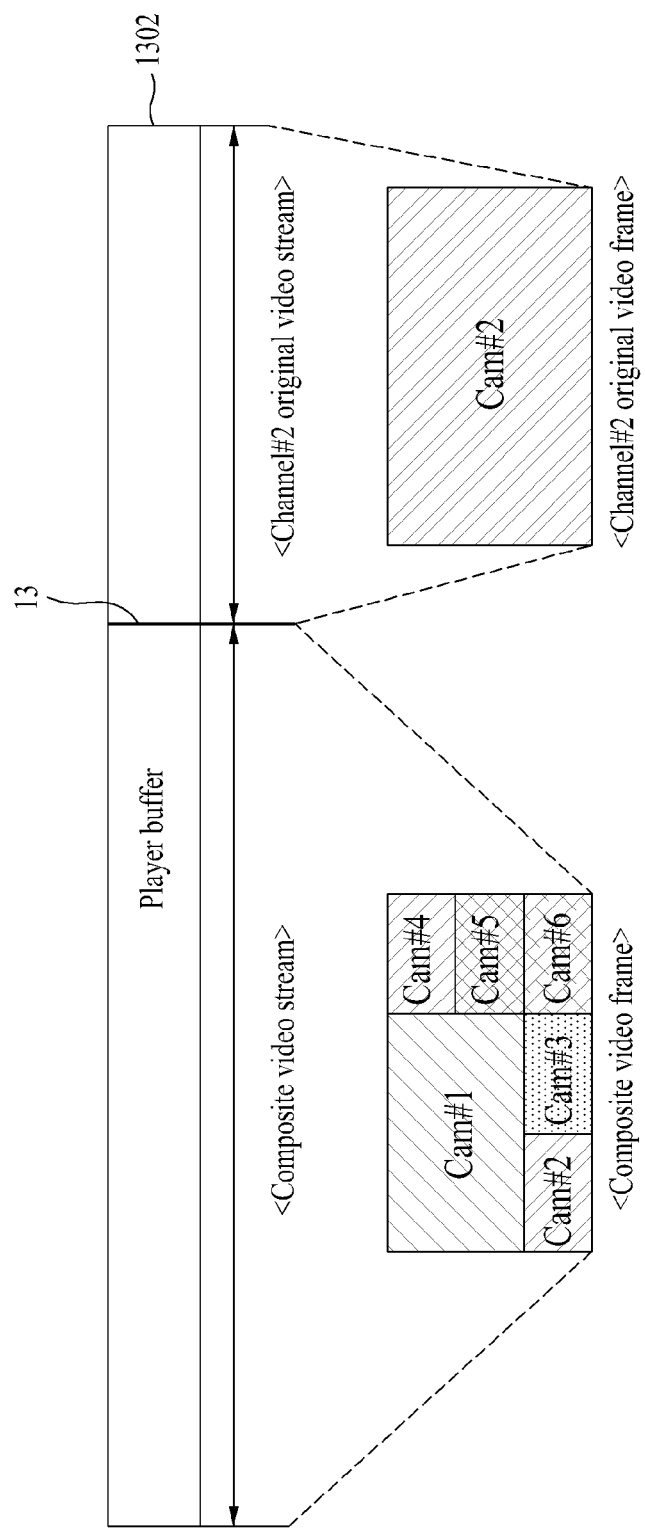
FIG. 13 illustrates an example of a process of determining a video switching point in time according to an example embodiment.

For example, referring to FIG. 13, the player 330 may identify a corresponding video with metadata 13 included in a TS chunk of a video stream within a buffer 1320 and, through this, may determine a video switching point in time. That is, if a timed metadata value is input at a corresponding point in time when switching from a composite video stream to a channel #2 original video stream, a stream input after the timed metadata may be recognized as a channel #2 original video and used.

In a system with a structure of providing a live video service through a session connection between a client and a server, a server end may change a video switching point in time. However, in the case of a session base, a service may be provided to a limited number of users. Dissimilarly, the example embodiments may allow a client side to determine a video switching point in time using timed metadata, and particularly, may provide a live streaming video service through not a session based, but HTTP-based protocol. Therefore, the example embodiment may apply even to an existing system environment and may provide a stable service to many users.

According to example embodiments, it is possible to play back a multi-channel live video using minimum network resources by receiving a single stream. in which live videos of multiple channels are synthesized and thereby configuring a multi-view in a multi-live transmission environment. In addition, according to example embodiments, it is possible to enhance quality of service (QoS) and quality of experience (QoE) by implementing a fast-switching mode while maintaining synchronization of audio and video when switching between channels in a multi-live transmission environment.

The apparatuses described herein may be implemented using hardware components, software components, and/or a combination of the hardware components and the software components. For example, the apparatuses and the components described herein may be implemented using one or more processing devices or computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. A processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that the processing device may include multiple processing elements and/or multiple types of processing elements. For example, the processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied in any type of machine, component, physical equipment, a computer storage medium or device, to be interpreted by the processing device or to provide an instruction or data to the processing device. The software also may be distributed over network coupled computer systems so that the software is stored and executed in a distributed fashion. The software and data may be stored by one or more computer readable storage media.

The methods according to the above-described example embodiments may be configured in a form of program instructions performed through various computer devices and recorded in non-transitory computer-readable media. Here, the media may continuously store computer-executable programs or may transitorily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are configured to store program instructions, such as read-only memory (ROM), random access memory (RAM), flash memory, and the like. Examples of other media may include record media and storage media managed by an app store that distributes applications or a site that supplies and distributes other various types of software, a server, and the like.

Although the example embodiments are described with reference to some specific example embodiments and accompanying drawings, it will be apparent to one of ordinary skill in the art that various alterations and modifications in form and details may be made in these example embodiments without departing from the spirit and scope of the claims and their equivalents. For example, suitable results may be achieved if the described techniques are performed in different order, and/or if components in a described system, architecture, device, or circuit are combined in a different manner, and/or replaced or supplemented by other components or their equivalents.

Therefore, other implementations, other example embodiments, and equivalents of the claims are to be construed as being included in the claims.

What is claimed is:

1. A live video playback method executed by a computer device including at least one processor configured to execute computer-readable instructions stored in a memory, the live video playback method comprising:
    accessing a plurality of composite videos prepared in an encoder server, wherein the plurality of composite videos include videos of multiple channels that are synthesized into a single video in a live transmission environment as a plurality of multi-view modes, where each of the multi-view modes includes the videos of the same multiple channels in a different layout;
    receiving, by the at least one processor from the encoder server, a selected one of the composite videos from the plurality of composite videos; and
    receiving, by the at least one processor, an original video of a specific channel in response to a selection of a video of the specific channel in the multi-view and switching the mode of view from the multi-view to a full-view for the video of the specific channel, and
    wherein a video stream corresponding to previous data is flushed from a player buffer for video switching between the multi-view and the full-view, and
    wherein the method further comprises:
    receiving, by the at least one processor, the composite video and switching from the full-view to the multi-view in response to receiving a switching request from the full-view to the multi-view,
    wherein the switching to the multi-view comprises rendering a temporary screen to a layout of the multi-view in response to the switching request and then receiving the composite video and rendering channel-wise sprites separated from the composite video to the layout of the multi-view,
    wherein the switching to the multi-view comprises configuring the temporary screen as a temporary view using one of a thumbnail included in a video stream, a copy of the original video, and a last video displayed in the multi-view before switching to the full-view, and
    wherein, in response to the switching request, the full-view is first switched to the temporary view, and then to the multi-view.

2. The live video playback method of claim 1, wherein the configuring of the multi-view comprises:
    acquiring a channel-wise sprite by separating a composition image for each channel from the composite video; and
    configuring the multi-view by rendering the channel-wise sprite according to a layout.

3. The live video playback method of claim 1, wherein the composite video is configured as a main video having a resolution higher than that of a video of at least one remaining other channel and the video of the remaining other channel is configured as a sub-video.

4. The live video playback method of claim 1, wherein the switching to the full-view comprises rendering a sprite of the specific channel among channel-wise sprites separated from the composite video to a full screen in response to the selection of the video of the specific channel in the multi-view and then receiving the original video and rendering the original video to the full screen.

5. The live video playback method of claim 4, wherein, in the full-view in which the sprite of the specific channel is rendered to the full screen, a sprite of at least one remaining other channel is included in a hidden state without being rendered.

6. The live video playback method of claim 1, wherein, when the temporary screen is configured using the copy of the original video, the copy is displayed through blur-processing in the temporary view.

7. The live video playback method of claim 1, wherein a segment duration of a video stream is changed for video switching between the multi-view and the full-view.

8. The live video playback method of claim 1, wherein a video switching point in time between the multi-view and the full-view is determined using timed-metadata included in a container of a video stream.

9. A non-transitory computer-readable recording medium storing a program to computer-implement the live video playback method of claim 1.

10. A computer device comprising:
    at least one processor configured to execute computer-readable instructions stored in a memory,
    wherein the at least one processor is configured to:
    access a plurality of composite videos prepared in an encoder, wherein the plurality of composite videos include videos of multiple channels that are synthesized into a single video in a live transmission environment as a plurality of multi-view modes, where each of the multi-view modes include the videos of the same multiple channels in a different layout;
    receive, from the encoder, a selected one of the composite videos from the plurality of composite videos; and
    receive an original video of a specific channel in response to a selection of a video of the specific channel in the multi-view and switch the mode of view from the multi-view to a full-view for the video of the specific channel, and
    wherein a video stream corresponding to previous data is flushed from a player buffer for video switching between the multi-view and the full-view, and
    wherein the at least one processor is also configured to:
    receive the composite video and switch from the full-view to the multi-view in response to receiving a switching request from the full-view to the multi-view, and
    render a temporary screen to a layout of the multi-view in response to the switching request and then receive the composite video and render channel-wise sprites separated from the composite video to the layout of the multi-view, and
    wherein the temporary screen is configured as a temporary view using one of a thumbnail included in a video stream, a copy of the original video, and a last video displayed in a multi-view before switching to the full-view, and
    wherein, in response to the switching request, the full view is first switched to the temporary view, and then to the multi view.

11. The computer device of claim 10, wherein the at least one processor is configured to:

acquire a channel-wise sprite by separating a composition image for each channel from the composite video, and configure the multi-view by rendering the channel-wise sprite according to a layout.

12. The computer device of claim 10, wherein the at least one processor is configured to:

render a sprite of the specific channel among channel-wise sprites separated from the composite video to a full screen in response to the selection of the video of the specific channel in the multi-view and then, receive the original video and render the original video to the full screen.

13. The computer device of claim 10, wherein the at least one processor is configured to change a segment duration of a video stream for video switching between the multi-view and the full-view.

14. The computer device of claim 10, wherein the at least one processor is configured to determine a video switching point in time between the multi-view and the full-view using timed metadata included in a container of a video stream.

15. The computer device of claim 10, wherein, when the temporary screen is configured using the copy of the original video, the copy is displayed through blur-processing in the temporary view.

\* \* \* \* \*